United States Patent [19]
Yoshioka

[11] Patent Number: 6,065,452
[45] Date of Patent: May 23, 2000

[54] FUEL FEEDER FOR VEHICLES

[75] Inventor: Hiroshi Yoshioka, Tokyo, Japan

[73] Assignee: Mitsubishi Denki Kabushiki Kaisha, Tokyo, Japan

[21] Appl. No.: 09/341,875

[22] PCT Filed: Nov. 19, 1997

[86] PCT No.: PCT/JP97/04214

§ 371 Date: Jul. 19, 1999

§ 102(e) Date: Jul. 19, 1999

[87] PCT Pub. No.: WO99/25975

PCT Pub. Date:May 27, 1999

[51] Int. Cl.[7] .................................................. F02M 37/04
[52] U.S. Cl. .......................................... 123/509; 137/585
[58] Field of Search .............................. 123/509; 137/585

[56] References Cited

U.S. PATENT DOCUMENTS

| | | | |
|---|---|---|---|
| 5,482,021 | 1/1996 | Roche ...................................... | 123/509 |
| 5,649,514 | 7/1997 | Okada et al. ............................ | 123/509 |
| 5,769,061 | 6/1998 | Nagata et al. ........................... | 123/509 |
| 5,809,975 | 9/1998 | Tuckey et al. ........................... | 123/590 |
| 5,988,213 | 11/1999 | Yoshioka ................................. | 137/590 |

FOREIGN PATENT DOCUMENTS 1-37178 11/1989 Japan .
3-105053 5/1991 Japan .

*Primary Examiner*—Thomas N. Moulis
*Attorney, Agent, or Firm*—Sughrue, Mion, Zinn, Macpeak & Seas, PLLC

[57] ABSTRACT

A vehicular fuel supply apparatus in which a sub-tank 21 that is inserted into and attached to the bottom wall opening 1*b* of the fuel tank 1 has integrally formed therein by molding a fuel chamber 24, support cavities 7*c*, 22*c*, 23*c* and a fuel flow paths 27 and 29, and a fuel pump 7, a fuel filter 22 and a pressure regulator 23 are accommodated and supported within the respective support cavities. The fuel chamber 24 is substantially closed against a rush flow of the fuel except for the air vent hole 24*b* and the fuel inlet port 24*a* through which the fuel flows at a predetermined flow rate per time, and has formed in the wall surface of the fuel pump support cavity 7*c* a groove 38 for accommodating and supporting a power supply line 11. Parts for assembling the components or elements of the apparatus are not necessary and the weight and the parts number is decreased, resulting in an easy assembly and a small cost. Also, the fuel does not flow out from the sub-tank even at the time of the abrupt acceleration or deceleration of the vehicle.

11 Claims, 5 Drawing Sheets

FUEL FEEDER FOR VEHICLES

TECHNICAL FIELD

This invention relates to a vehicular fuel supply apparatus that can be assembled into a fuel tank from its bottom surface.

BACKGROUND ART

FIG. 6 is a vertical sectional side view illustrating the conventional vehicular fuel supply apparatus disclosed in Japanese Utility Model Publication No. 1-37178, for example. In the Figure, 1 is a fuel tank storing fuel 2 therein, 1a is a bottom wall of the fuel tank 1, 1b is a bottom wall opening disposed in the bottom wall 1a of the fuel tank 1. 3 is a set plate attached to the bottom wall opening 1b via a packing 4 in an oil-tight manner. Provided on the inside surface 3a of the set plate 3 are a sub-tank 5 inserted into the interior of the fuel tank 1 and an in-tank type fuel pump 7 mounted to the inside bottom surface 5a of the sub-tank 5, and a suction filter 8 is mounted to a suction port 7a of the fuel pump 7. The sub-tank 5 is provided in order to prevent the fuel 2 from being not supplied from the fuel pump 7 to the engine (not shown) even when the vehicle body tilts in the state that the fuel 2 within the fuel tank 1 is reduced.

The discharge port 7b of the fuel pump 7 has a main tube 10 connected thereto by a rubber hose 9, the tube 10 being bent downwardly to oil-tightly pass through the set plate 3 and being connected by a joint 14 to a delivery pipe 16 extending to the engine (not shown). Further, a power supply line 11 having a connector 12 attached to the exterior of the fuel tank 1 is passed through the set plate 3 in an oil-tight manner and connected to a power supply terminal 13 of the fuel pump 7.

Disposed at the downstream side of the delivery pipe 16 are a fuel filter 17 located outside of the fuel filter 1 for filtering the dusts within the fuel 2, an injector 18 for injecting fuel into each cylinder of the engine and a pressure regulator 19 for regulating the pressure of the fuel injected from the injector 18 to be constant. The return pipe 20 is disposed for returning a portion of the fuel 2 as an excess fuel from the pressure regulator 19 to the fuel tank 1 and the an end portion 20a on the fuel tank 1 side extends through the set plate 3 to open within the fuel tank 1.

Then, the operation of the conventional vehicular fuel supply apparatus will now be described.

By applying a voltage from the power supply terminal 13 through the connector 12 and the power supply line 11 to drive the fuel pump 7, the fuel 2 in the fuel tank 1 is sucked from the suction filter 8, pressurized in the fuel pump 7 and supplied through the main tube 10 to the delivery pipe 16 extending toward the engine. Thereafter, the fuel 2 is filtered in the fuel filter 17 and injected into each cylinder of the engine from the injector 18. In order that the pressure regulator 19 regulates the fuel pressure to be constant, a portion of the fuel 2 is returned to the fuel tank 1 as an excess fuel from the pressure regulator 19 through the return pipe 20.

In the above-described vehicular fuel supply apparatus, mounting parts (not shown) for attaching the fuel filter 17 and the pressure regulator 19 disposed at the outside of the fuel tank 1 is necessary, so that the vehicle body weight is increased and the steps for assembling the vehicle body assembly is increased, resulting in a cost increase.

Also, since the sub-tank 5 is cup-shaped that is open at the lop end 5b, the fuel 2 within the sub-tank 5 can flow over the top end 5b of the sub-tank 5 to out of the sub-tank 5. Therefore, a problem has been raised in that the function as a sub-tank, which prevents the fuel from not being supplied to the engine by the fuel pump 7 when the fuel 2 within the fuel tank 1 is decreased, is deteriorated.

Further, another problem has been presented in that, when the set plate 3 is to be assembled into the fuel tank 1, the power supply line 11 for energizing the fuel pump 7 is damaged by the edge of the opening 1b of the fuel tank 1, thereby damaging the insulation on the surface of the power supply line 11.

This invention has been made to solve the above-discussed problems and has as its object the provision of a vehicular fuel supply apparatus in which the vehicle weight and the cost are not increased due to the attaching parts for the fuel filter and the pressure regulator.

Another object is to provide a vehicular fuel supply apparatus in which the function of the sub-tank cannot be damaged even at the time of an abrupt starting and abrupt braking of the vehicle when the fuel is decreased.

Further object is to provide a vehicular fuel supply apparatus that is free from the damages to the insulation on the power supply line surface at the time of assembly.

DISCLOSURE OF INVENTION

The vehicular fuel supply apparatus of the present invention comprises a sub-tank capable of being oil-tightly attached to the bottom wall opening of the fuel tank and having a fuel chamber for receiving the fuel within the fuel tank, a fuel pump for pumping the fuel within the fuel chamber, a fuel filter for filtering the fuel from the fuel pump, a pressure regulator for relieving an excess fuel from the fuel filter, and a fuel outlet port for supplying the fuel from the fuel filter to the exterior of the fuel tank, the sub-tank comprising a fuel pump support cavity, a fuel filter support cavity and a pressure regulator support cavity for accommodating and supporting the fuel pump, the fuel filter and the pressure regulator, respectively.

According to a preferred embodiment, the sub-tank comprises a set plate attached to the bottom wall opening of the fuel tank and capable of closing it, a sub-tank main body attached to the set plate and including the fuel chamber, the fuel pump support cavity, the fuel filter support cavity and the pressure regulator support cavity, a top plate member combined with the sub-tank main body to cover its top end for communicating the fuel pump support cavity to the fuel filter support cavity, and a securing member attached to the set plate for securing the sub-tank main body and the top plate member in an assembled state to the set plate.

Also, the sub-tank main body comprises an air vent hole for communicating an upper space of the fuel chamber to the exterior of the sub-tank main body, and a fuel inlet port for communicating a bottom space of the fuel chamber to the exterior of the sub-tank main body for allowing the fuel in the fuel tank to flow into the fuel chamber at a predetermined flow rate per time, and wherein the fuel chamber is substantially closed against a rush flow of the fuel except for the fuel inlet port and the air vent hole.

Further, the sub-tank main body comprises a groove provided in a wall surface defining the fuel pump support cavity, the groove accommodating and supporting a power supply line extending from the exterior of the sub-tank to the fuel pump.

Also, the fuel filter includes a filter element directly accommodated and supported within the fuel filter support cavity.

Also, the vehicular fuel supply apparatus comprises a sensor supported by the sub-tank for detecting the liquid level of the fuel.

Also, the top plate member includes a groove having one end communicating with the fuel pump support cavity and the other end communicating with the fuel filter support cavity.

Also, the fuel filter accommodated within the fuel filter support cavity is held and supported by the top plate member associated with the sub-tank main body.

Further, the fuel pump accommodated within the fuel pump support cavity is held and supported by an elastic member disposed between the fuel pump and the set plate.

Also, the securing member is secured at its one end to the set plate and provided at its the other end with a hook portion that engages the top plate member associated with the sub-tank main body.

Also, the fuel chamber is disposed between the fuel pump support cavity and the fuel filter support cavity and the pressure regulator support cavity is disposed below the fuel filter support cavity.

BEST MODE FOR CARRYING OUT THE INVENTION

Figure 1:
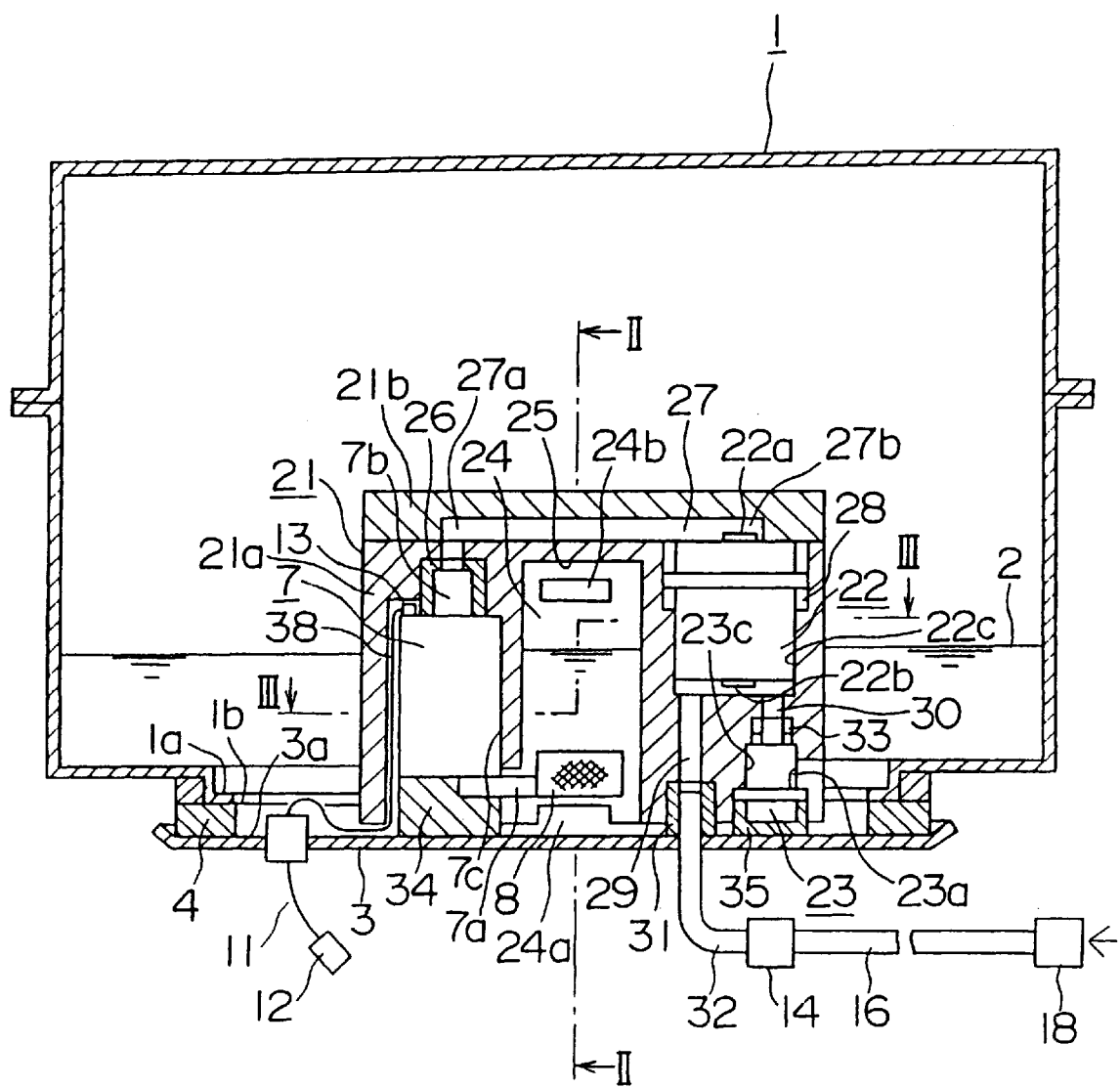
FIG. 1 is a sectional side view illustrating one embodiment of the vehicular fuel supply apparatus of the present invention together with the fuel tank.
Figure 2:
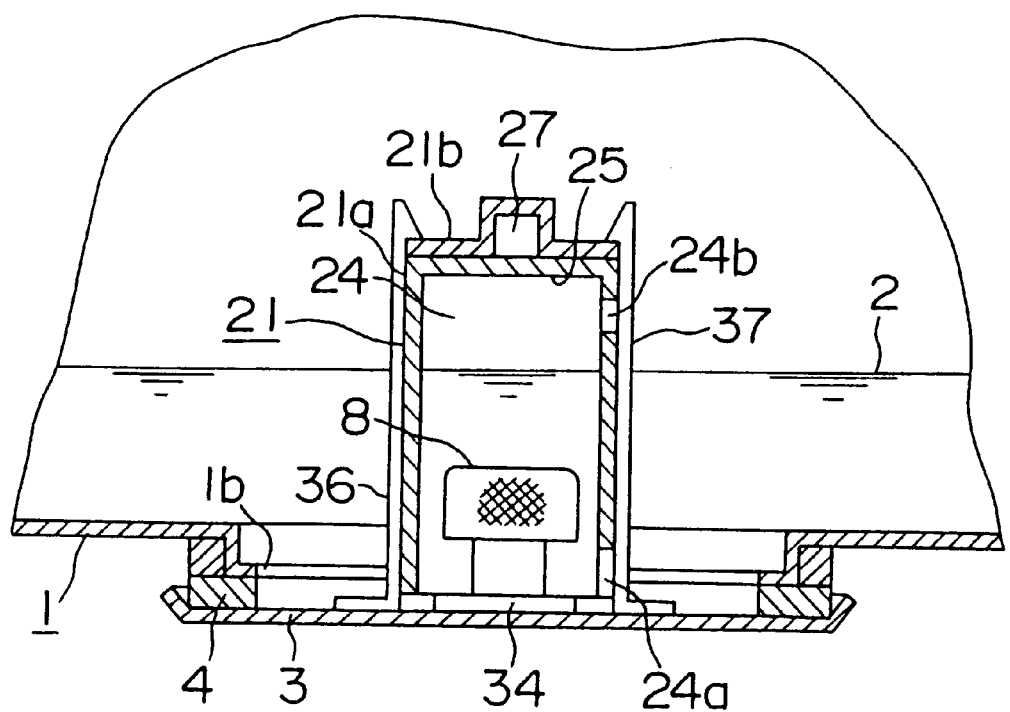
FIG. 2 is a sectional front view taken along line II—II of FIG. 1.
Figure 3:
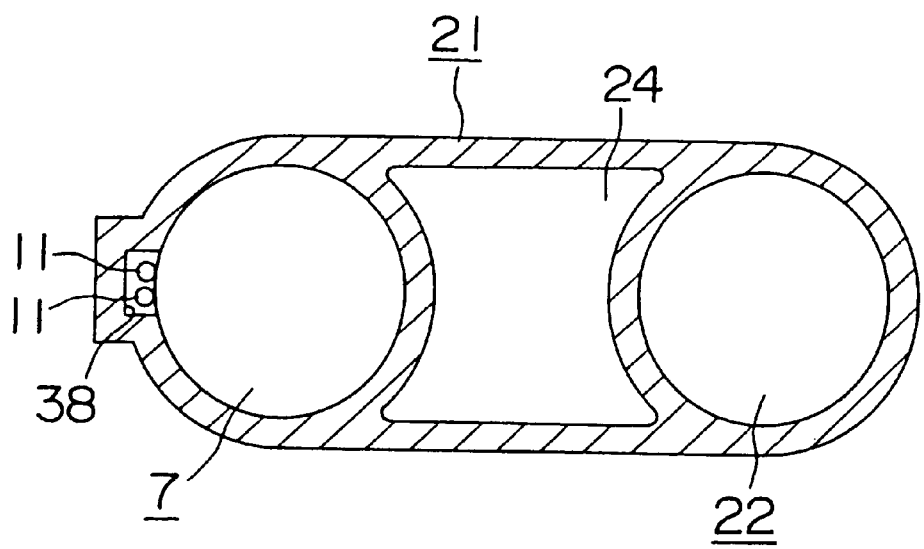
FIG. 3 is a sectional plan view taken along line III—III of FIG. 1.

FIGS. 1 to 3 illustrate one embodiment of the vehicular fuel supply apparatus of the present invention, in which Figures, the vehicular fuel supply apparatus comprises a sub-tank 21 capable of being oil-tightly attached to a bottom wall opening 1b of a fuel tank 1 and having a fuel chamber 24 for receiving the fuel within the fuel tank 1, a fuel pump 7 for pumping the fuel within the fuel chamber 24, a fuel filter 22 for filtering the fuel from the fuel pump 7, a pressure regulator 23 for relieving an excess fuel from the fuel filter 22, and a fuel outlet port 29 for supplying the fuel from the fuel filter 22 to the exterior of the fuel tank 1.

The sub-tank 21 comprises a set plate 3 attached to the bottom wall opening 1b of the fuel tank 1 and capable of closing it, a sub-tank main body 21a attached to an inside surface of the set plate 3 and installed within the fuel tank 1, and a top plate member 21b combined with the sub-tank main body 21a.

The sub-tank main body 21a is a one-piece component integrally molded with a resin such as polyacetal or the like and includes a fuel chamber 24 closed at its top portion by a cover portion 25, a fuel pump support cavity 7c for accommodating and supporting the fuel pump 7, a fuel filter support cavity 22c for accommodating and supporting the fuel filter 22 and a pressure regulator support cavity 23c for accommodating and supporting the pressure regulator 23. The fuel chamber 24 is provided with the cover portion 25, so that it is substantially closed against a rush flow of the fuel except for the communications through a fuel inlet port 24 and an air vent hole 24b which will be described later, whereby the fuel 2 within the sub-tank 21 is not permitted to flow out of the sub-tank 21 even when the abrupt starting and abrupt braking of the vehicle.

The fuel chamber 24 closed at the top portion by the cover portion 25, the fuel pump support cavity 7c, the fuel filter support cavity 22c and the pressure regulator support cavity 23c are formed within the sub-tank main body 21a. The top plate member 21b joined and associated by heat plate welding or the like to the sub-tank main body 21a to cover its top surface is provided with a groove 27, which groove 27 communicates at one end 27a with the discharge port 7b of the fuel pump 7 within the fuel pump support cavity 7c through a bushing 26 and communicates at the other end 27b with the inlet side 22a of the fuel filter 22 within the fuel filter support cavity 22c, thereby defining an inner flow path 27 for communicating the fuel pump support cavity 7c and the fuel filter support cavity 22c together.

In order to secure the sub-tank main body 21a and the top plate member 21b in the assembled state to the set plate 3, there is provided securing members 36 and 37 (see FIG. 2) connected at one end to the set plate 3 and having at the other end hook portions engaging the top plate member 21b associated with the sub-tank main body 21a. With this securing members 36 and 37, the assembly of the sub-tank main body 21a, the top plate member 21b and the set plate 3 can be very easily achieved by a snap-action through the use of the elasticity of the securing members 36 and 37. Thus, assembled, the fuel filter 22 accommodated within the fuel filter support cavity 22c is held and supported by the top plate member 21b associated with the sub-tank main body 21a. Also, the fuel pump 7 accommodated within the fuel pump support cavity 7c is held and supported by an elastic member 34 disposed between the fuel pump 7 and the set plate 3. Also, the fuel chamber 24 is disposed between the fuel pump support cavity 7c and the fuel filter support cavity 22c, and the pressure regulator support cavity 23c is disposed below the fuel filter support cavity 22c. This arrangement allows the apparatus to be small-sized.

The sub-tank main body 21a also comprises an air vent hole 24b for communicating an upper space of the fuel chamber 24 to the exterior of the sub-tank main body 21a, and a fuel inlet port 24a for communicating a bottom space of the fuel chamber 24 to the exterior of the sub-tank main body 21a for allowing the fuel in the fuel tank 1 to flow into the fuel chamber 24 at a predetermined flow rate per time. The fuel inlet port 24a is selected to have suitable cross-sectional area and the configuration so that the fuel rushes to flow out of the sub-tank 21 even when the tank 1 tilts when the fuel is decreased and at the same time, the supply of the fuel by the fuel pump 7 from the sub-tank 21 is sufficient.

Further, the sub-tank main body 21a comprises a groove 38 provided in a wall surface defining the fuel pump support cavity 7c, the groove 38 accommodating and supporting a power supply line 11 extending from the exterior of the sub-tank 21 to the fuel pump 7. Therefore, it is possible to prevent that, when the set plate 3 is to be assembled into the fuel tank 1, the power supply line 11 for energizing the fuel pump 7 is damaged by the edge of the opening 1b of the fuel tank 1, thereby damaging the insulation on the surface of the power supply line 11.

The fuel filter 22 is accommodated and supported within the fuel filter support cavity 22c, and the clearance is sealingly closed between the inlet side 22a and the outlet side 22b of the fuel filter 22 so as not to generate a leak through the gap between the surface of the fuel filter 22 and the wall surface of the support cavity 22c. The outlet side 22b of the fuel filter 22 is divided into a second inner flow path 29 and a third inner flow path 30 defined in the sub-tank main body 22a, the second inner flow path 29 being connected to the main tube 32 through the bushing 31.

The main tube 32 is oil-tightly passed through the set plate 3 and connected by the joint 14 to the delivery pipe 16 leading to the engine (not shown). The downstream side of the delivery pipe 16 is provided with the injector 18 for injecting the fuel 2 into the respective cylinders of the engine.

On the other hand, the third inner flow path 30 is connected to the pressure regulator 23 supported by the sub-tank main body 21a through an O-ring 33, and the pressure regulator 23 is provided with a relief port 23a for returning a portion of the fuel 2 as an excess fuel to the fuel tank 1 in order to maintain the fuel pressure at constant.

The fuel pump 7 is supported by the sub-tank 21 and is mounted to the set plate 3 through a first cushion 34 made of an elastic material, and the pressure regulator 23 is mounted to the set plate 3 through a second cushion 35 made of an elastic material. Also, the sub-tank 21 is secured to the set plate 3 by hook-shaped stays 36 and 37 attached to the set plate 3 through the use of the deformation recovering force of the cushions 34 and 35 as shown in FIG. 2.

The power supply line 11 having one end extending to the exterior of the fuel tank 1 and provided with the connector 12 is oil-tightly passed through the set plate 3 extends through the power supply line support groove 38 disposed in the sub-tank 21 and connected to the power supply terminal 13 (shown in FIG. 1) of the fuel pump 7 as shown in FIG. 3.

To operate the vehicular fuel supply apparatus of the present invention, a voltage is applied from the power supply terminal 13 through the connector 12 and the power supply line 11 to drive the fuel pump 7. Then, the fuel 2 within the fuel tank 1 is suctioned through the suction filter 8, pressurized in the fuel pump 7, flows through the first inner flow path 27, filtered in the fuel filter 22, supplied from the second inner flow path 29 to the delivery pipe 16 directed to the engine through the main tube 32, and injected from the injector 18 into the respective cylinders of the engine.

On the other hand, the fuel 2 that flows into the pressure regulator 23 from the third inner flow path 30, when the pressure is higher than tie set value, a portion of the fuel 2 is returned into the fuel tank 1 by the pressure regulator 23 from the relief port 23a of the pressure regulator 23 to regulate the fuel pressure to be constant.

In the vehicular fuel supply apparatus as above described, since the sub-tank 21 contains the fuel filter 22 and supports the pressure regulator 23, a separate mounting part for attaching the fuel filter 22 and the pressure regulator 23 to the vehicular body is not necessary, decreasing the number of parts, not increasing the vehicular body weight, decreasing the assembly steps in the vehicle assemble line and preventing the cost increase.

Also, the cover portion 25 is disposed at the upper end of the sub-tank 21, the fuel inlet port 24a is provided at the most lower end of the sub-tank 21 and the air outlet port 24b is opened in the vicinity of the cover portion 25 of the sub-tank 21, so that the fuel 2 within the sub-tank 21 does not rush heavily out of the sub-tank 21, preventing the function of the sub-tank 21 from being damaged even at the time of an abrupt starting and abrupt braking of the vehicle.

Further, the power supply line support groove 38 formed in the sub-tank 21 accommodates and supports the power supply line 11 for energizing the fuel pump 7, so that the damages to the surface insulation of the power supply line 11 by the edge of the opening 1b of the fuel tank 1 at the time of assembling of the set plate 3 to the fuel tank 1 can be prevented.

Figure 4:
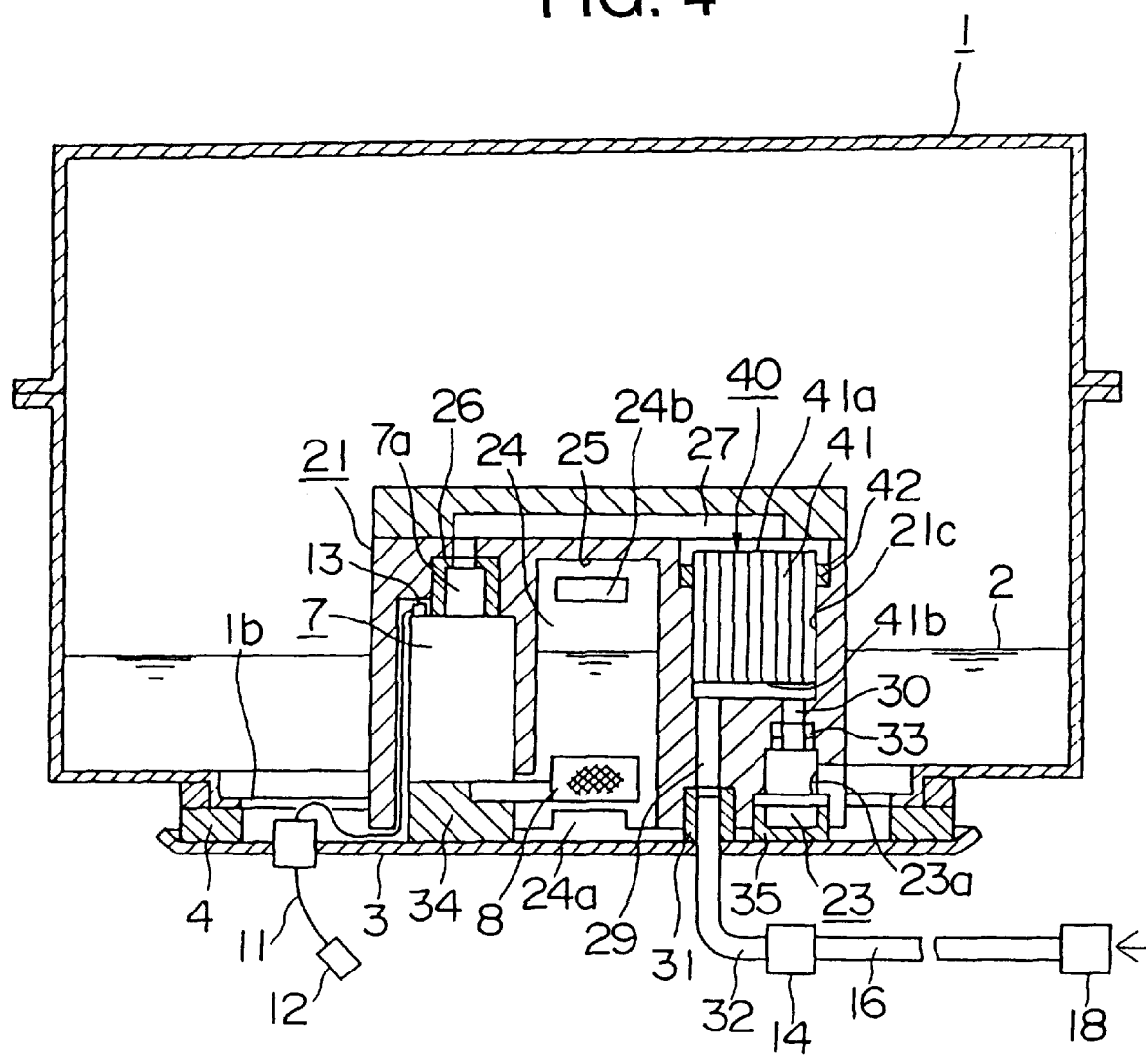
FIG. 4 is a sectional side view illustrating another embodiment of the vehicular fuel supply apparatus of the present invention.

FIG. 4 illustrates another embodiment of the vehicular fuel supply apparatus of the present invention, in which 1~4, 7, 8, 11~14, 16, 18, 21, 23~27, 29~35 are similar to those of the embodiment shown in FIGS. 1 to 3, so that their explanations will be omitted. 40 is a fuel filter, of which filter element 41 is directly accommodated within an inner wall portion of a cylindrical shape, for example, or the support cavity 21c of the sub-tank 21, a fuel inlet port 41a being provided above the filter element 41 and a fuel outlet port 41b being provided below the filter element 41, and it is oil-tightly bonded by a bonding agent 42 so as to prevent the fuel 2 from leaking through a clearance between the support cavity 21c and the outer circumference portion of the filter element 41.

The fuel 2 suctioned from the fuel tank 1 through the suction filter 8 and pressurized in the fuel pump 7 is passed through the first inner flow path 27 to be filtered by the filter element 41 and supplied to the second inner flow path 29 and the third inner flow path 30.

In the vehicular fuel supply apparatus thus constructed, the inner wall portion 21c of the sub-tank 21 is employed as the case for accommodating the filter element 41, different from the filter 22 of FIG. 1 in which the filter element is received within a case, so that a special case for accommodating the filter element 41 of the fuel filter 40 is not needed, preventing the increase of the vehicle body weight and the cost increase.

Figure 5:
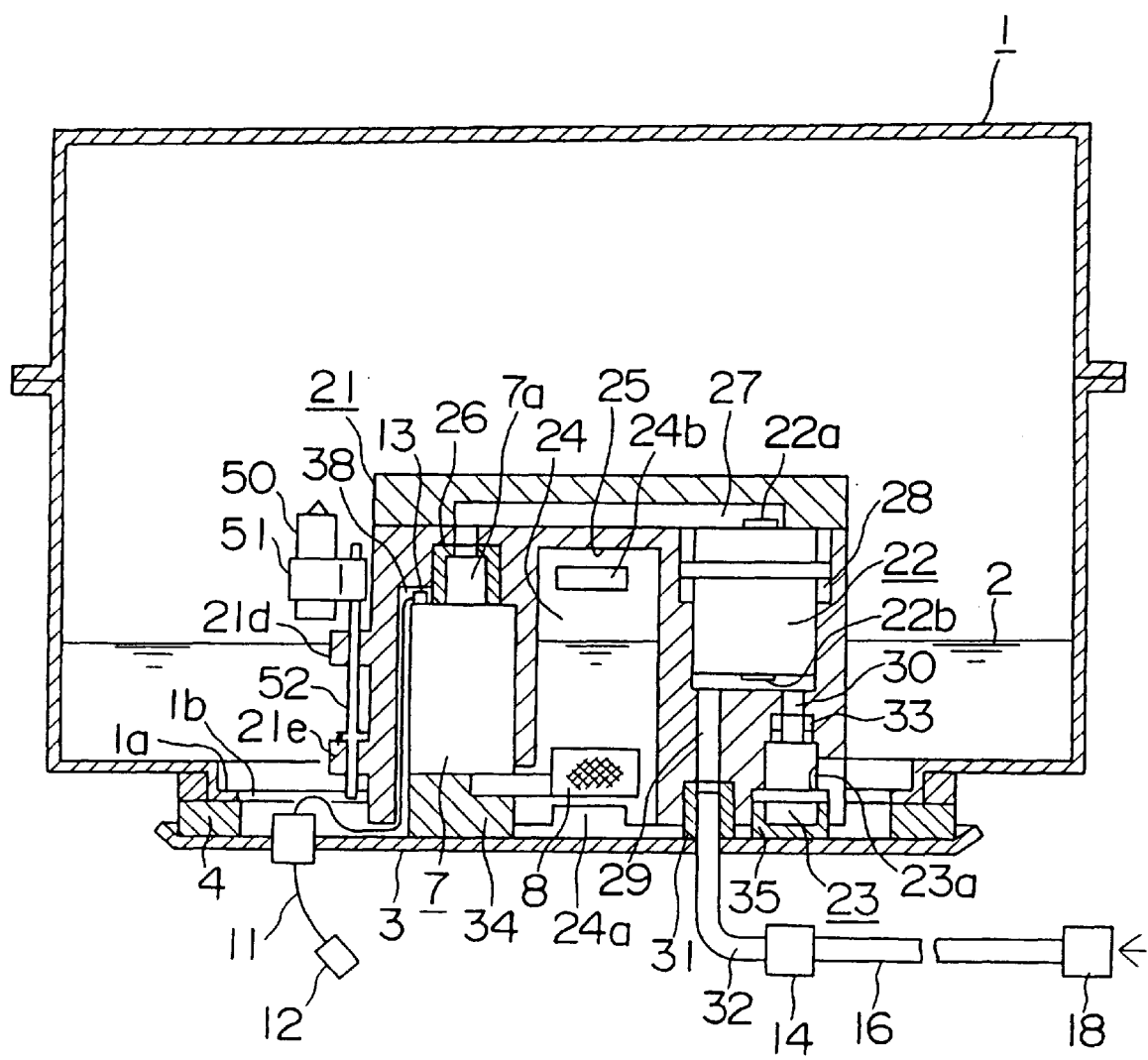
FIG. 5 is a sectional side view illustrating still another embodiment of the vehicular fuel supply apparatus of the present invention.
Figure 6:
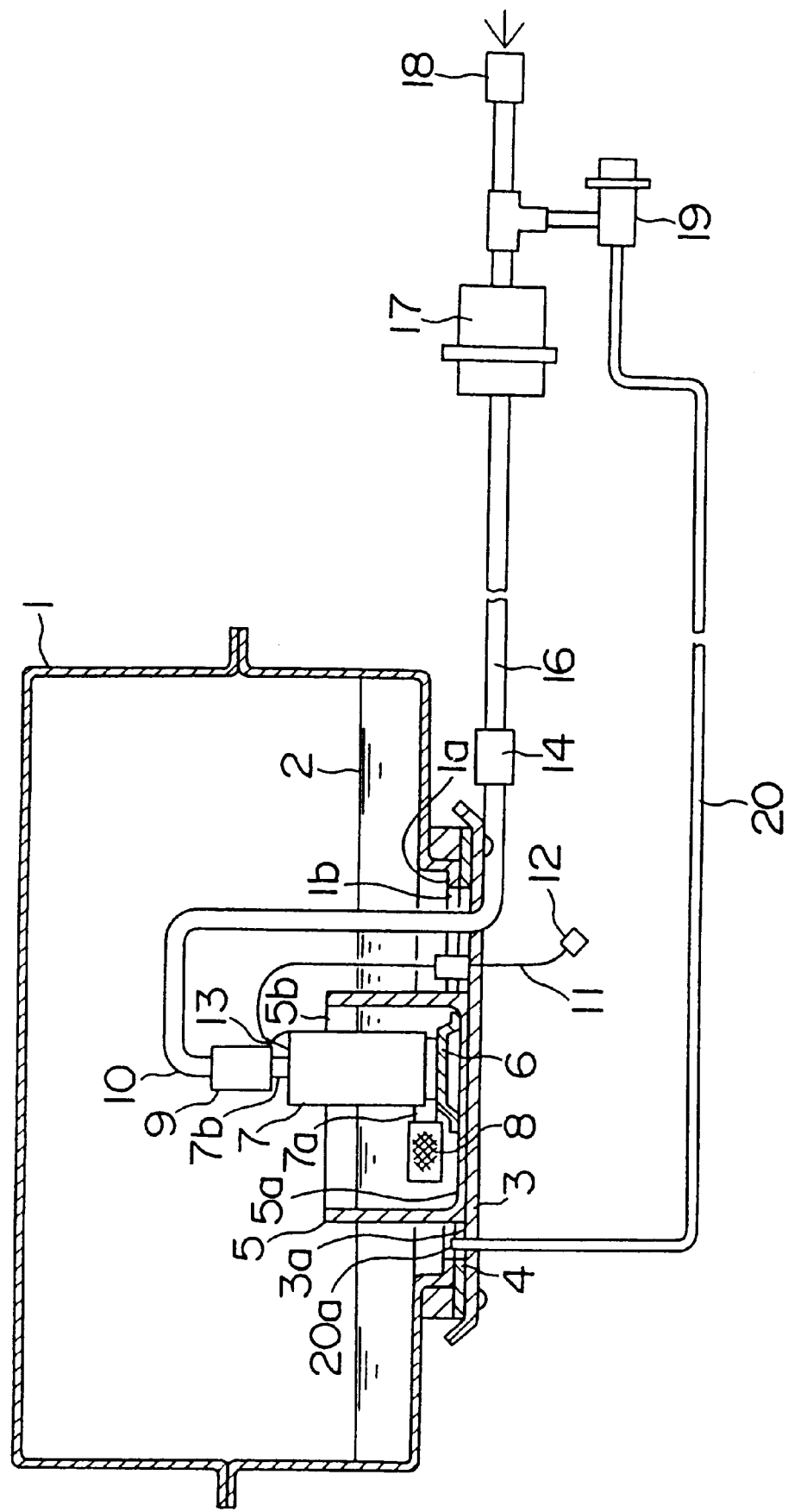
FIG. 6 is a sectional side view illustrating the conventional vehicular fuel supply apparatus.

FIG. 5 illustrates a further embodiment of the vehicular fuel supply apparatus of the present invention. In the Figure, 1~4, 7, 8, 11~14, 16,18, 21~35 are similar to those shown in FIGS. 1 to 3, so that their explanation will be omitted. In this embodiment, the vehicular fuel supply apparatus shown in FIGS. 1 to 3 has installed therein a sensor 50 for detecting the fuel level. The sensor 50 is a sensor for detecting the fuel level of the fuel 2 for the purpose of warning the driver that the fuel amount within the fuel tank 1 is small. In the illustrated example, the sensor 50 is a thermister, which is position-adjustably supported by thermister support portions 21d and 21e formed on the sides of the sub-tank 21 through a thermister holding member 51 and a relatively elongated support rod 52 supporting the thermister holding member 51. The level at which the thermister 50 is installed must be made variable depending upon the shape of the fuel tank 1 to be mounted, so that it is arranged to be equally applicable to a vehicle having a fuel tank 1 of a different configuration simply by changing the overall length of the support rod 52.

In the vehicle fuel supply apparatus thus constructed, the sub-tank 21 is provided with the thermister support portions 21d and 21e for supporting the sensor 50 for detecting the fuel level, so that there is no need for the special mounting parts for mounting the sensor 50 to the fuel tank 1, thereby preventing the increase in the vehicular body weight and the increase in costs.

INDUSTRIAL APPLICABILITY

As has been described above, in the vehicular fuel supply apparatus of the present invention, the vehicle body weight and the cost are not increased due to the attaching parts for the fuel filter and the pressure regulator. Also, the function of the sub-tank cannot be damaged even at the time of an abrupt starting and abrupt braking of the vehicle when the fuel is decreased. Further, the apparatus is free from the damages to the insulation on the power supply line surface at the time of assembly.

What is claimed is:

1. A vehicular fuel supply apparatus comprising;
   a sub-tank capable of being oil-tightly attached to the bottom wall opening of the fuel tank and having a fuel chamber for receiving the fuel within the fuel tank;
   a fuel pump for pumping the fuel within said fuel chamber;
   a fuel filter for filtering the fuel from said fuel pump;
   a pressure regulator for relieving an excess fuel from said fuel filter; and
   a fuel outlet port for supplying the fuel from said fuel filter to the exterior of said fuel tank;
   said sub-tank comprising a fuel pump support cavity, a fuel filter support cavity and a pressure regulator support cavity for accommodating and supporting said fuel pump, said fuel filter and said pressure regulator, respectively.

2. A vehicular fuel supply apparatus as claimed in claim 1, wherein said sub-tank comprising;
   a set plate attached to the bottom wall opening of said fuel tank and capable of closing it;
   a sub-tank main body attached to said set plate and including said fuel chamber, said fuel pump support cavity, said fuel filter support cavity and said pressure regulator support cavity;
   a top plate member combined with said sub-tank main body to cover its top end for communicating said fuel pump support cavity to said fuel filter support cavity; and
   a securing member attached to said set plate for securing said sub-tank main body and said top plate member in an assembled state to said set plate.

3. A vehicular fuel supply apparatus as claimed in claim 1, wherein said sub-tank main body comprises an air vent hole for communicating an upper space of said fuel chamber to the exterior of said sub-tank main body, and a fuel inlet port for communicating a bottom space of said fuel chamber to the exterior of said sub-tank main body for allowing the fuel in said fuel tank to flow into said fuel chamber at a predetermined flow rate per time, and wherein said fuel chamber is substantially closed against a rush flow of the fuel except for said fuel inlet port and said air vent hole.

4. A vehicular fuel supply apparatus as claimed in claim 1, wherein said sub-tank main body comprises a groove provided in a wall surface defining said fuel pump support cavity, said groove accommodating and supporting a power supply line extending from the exterior of said sub-tank to said fuel pump.

5. A vehicular fuel supply apparatus as claimed in claim 1, wherein said fuel filter includes a filter element directly accommodated and supported within said fuel filter support cavity.

6. A vehicular fuel supply apparatus as claimed in claim 1, further comprising a sensor supported by said sub-tank for detecting the liquid level of the fuel.

7. A vehicular fuel supply apparatus as claimed in claim 1, wherein said top plate member includes a groove having one end communicating with said fuel pump support cavity and the other end communicating with said fuel filter support cavity.

8. A vehicular fuel supply apparatus as claimed in claim 1, wherein said fuel filter accommodated within said fuel filter support cavity is held and supported by said top plate member associated with said sub-tank main body.

9. A vehicular fuel supply apparatus as claimed in claim 1, wherein said fuel pump accommodated within said fuel pump support cavity is held and supported by an elastic member disposed between said fuel pump and said set plate.

10. A vehicular fuel supply apparatus as claimed in claim 1, wherein said securing member is secured at its one end to said set plate and provided at its the other end with a hook portion that engages said top plate member associated with said sub-tank main body.

11. A vehicular fuel supply apparatus as claimed in claim 1, wherein said fuel chamber is disposed between said fuel pump support cavity and said fuel filter support cavity and said pressure regulator support cavity is disposed below said fuel filter support cavity.

* * * * *